Patented Oct. 16, 1928.

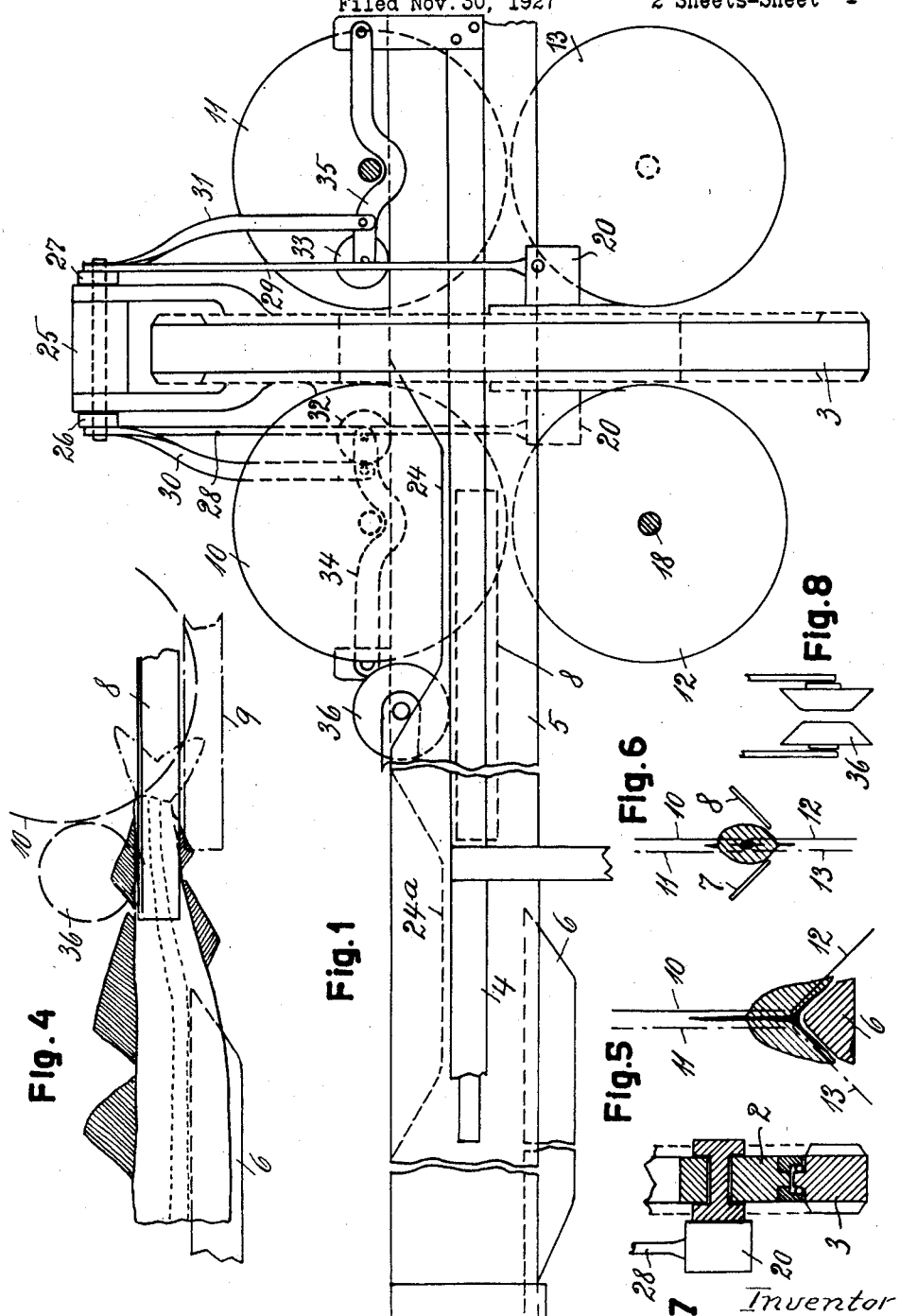

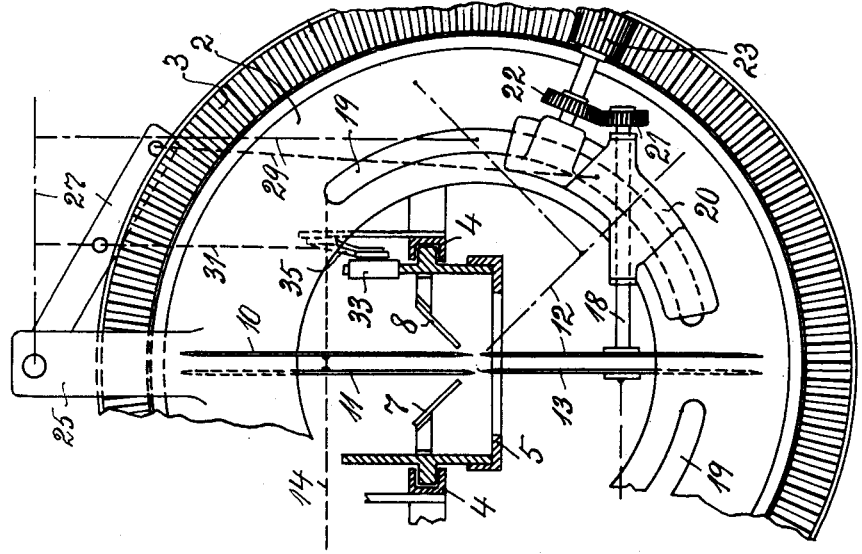
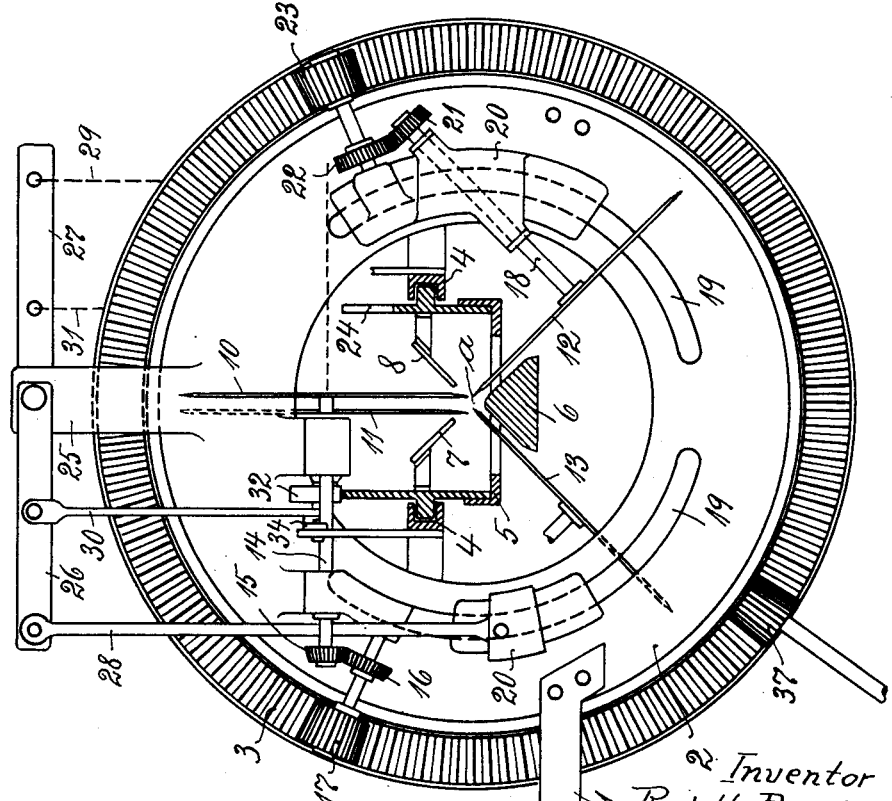

1,687,922

UNITED STATES PATENT OFFICE.

RUDOLPH BAADER, OF LUBECK, GERMANY.

APPARATUS FOR FILLETING FISH.

Application filed November 30, 1927, Serial No. 236,816, and in Germany September 28, 1927.

For producing fish-fillets fresh sea- or river-fish, which have been decapitated, are boned and separated in longitudinal direction into two halves, said halves being then skinned. The boning generally only the dorsal-bone and eventually a part of the rib-bones are removed, the dorsal-fins, which have sharp spines embedded in the flesh of the back, remaining in or on the fish-half, so that they have to be removed separately, in order to prepare the fillets ready for use.

This invention relates to a machine for filleting fish in which the decapitated fish are conducted towards rotating disk-knives, and the novelty consists in that the fishes resting with their abdominal cavity on or under a roof-shaped bracket, are pressed against two vertical-knives, arranged at a certain distance the one from the other, mounted either side by side or the one behind the other and being oscillatable, so that the fish are cut in longitudinal direction at either side of the dorsal-bone and at the side of the oval portion as well as at the side of the prismatic portion of the same, the dorsal-fins and the rib-bones being uncovered at the same time.

A machine, according to the invention, is shown, by way of example, in the accompanying drawing, in which:—

Fig. 1 shows the filleting-machine in side-elevation.

Figs. 2 and 3 show each a vertical cross-section.

Fig. 4 shows a fish placed on the bracket ready to be cut.

Figs. 5 and 6 show each a vertical cross-section through a fish.

Fig. 7 is a cross-section, showing the driving-gear.

Fig. 8 shows the guide-pulley in top-plan view.

With the machine-frame, not shown, a ring-shaped body 2 of cast iron is connected by means of clips 1. On this body 2 a ring gear 3 is rotatably mounted on balls, which has teeth directed towards both sides. On the ring-shaped body 2 a guide 4 for a carriage 5 is further mounted. The carriage 5 moves through the central-opening of the ring-shaped body 2. In the front-portion of the carriage 5 an inverted V-shaped or triangular-shaped bracket 6 is arranged, which serves as support for the fish to be cut, the abdominal cavity of the fish resting securely on said bracket so that the point of the bracket bears against the end of the abdominal cavity. In the carriage 5 two bars 7, 8 are further arranged, forming together a channel open at the lower end and designed to hold the fish-tail. Underneath these bars 7, 8 a tail-clamp 9 may be arranged, designed to grip the tail-fin of the fish. The tail-clamp is however not obsolutely necessary as the abutting of the front end of bracket 6 against the end of the abdominal cavity of the fish serves as stationary point at the boning of the fish.

The circular knives 10, 11, 12 and 13 are preferably arranged in pairs, the one behind the other and so that one pair of knives, an upper and a lower knife, is arranged on one side and the other pair of knives on the other side of the cast-iron-body so that the flesh is cut open first at one side of the dorsal bone and then at the other side of the dorsal bone. The knives might however be arranged in another manner.

The two upper knives 10 and 11, toothed in a manner known per se, extend in the same direction and are spaced the one from the other a distance corresponding to the cross-section of the dorsal-bone situated in the tail-portion of the fish, these knives 10 and 11 standing in the drawing the one behind the other. The two lower knives 12 and 13, which are also toothed, are oscillatably arranged so that they assume now a position in parallel planes and then positions at an angle the one to the other.

The knife 10 is mounted on a horizontal shaft 14, journalled in brackets arranged on the cast-iron-body 2. On the outer end of shaft 14 a bevel-wheel 15 is keyed, which meshes with a bevel-wheel 16, journalled on the cast-iron-body 2 and driven by a bevel pinion 17 gearing with the teeth of gear 3. The knife 11 is mounted in the same or in a similar manner and it is driven by the teeth on the rear-side of gear 3.

The knife 12 is mounted on a shaft 18, journalled in a bracket which is fixed on a slide 20 slidable in a curved slot 19 of the cast-iron-body 2. A bevel-wheel 21 keyed on the outer end of shaft 18 meshes with the bevel-wheel 22 journalled in slide 20 and driven by a bevel-pinion 23 gearing with the teeth of gear 3. The knife 13 is mounted in the same or in a similar manner and driven from the teeth on the rear side of gear 3.

On or in the carriage 5 notches or depressions forming cam surfaces or slots 24, 24ª are arranged, serving to oscillate the knives 12, 13. With this object in view a bracket 25 is arranged on the cast-iron-body 2 on which two levers 26 and 27 are oscillatably mounted standing perpendicular to the path of carriage 5 and connected by connecting rods 28 and 29, with the slides 20 slidably mounted in the curved slots 19. To each lever 26, 27 a rod 30, 31 respectively is further hingedly connected, said rods being connected each with a lever 34, 35 respectively which carries a roller 32 or 33. The levers 34, 35 are oscillatably mounted on a bracket of the machine-frame and the rollers 32, 33 are adapted to respectively engage the cam surfaces 24ª, 24 of the carriage 5.

Above the bars 7, 8, directly in front of knife 10, a guide-pulley 36, controlled by a spring, is arranged which bears upon the fish to be treated and serves to feed the fish to the knife as accurately as possible.

The machine is driven, in a manner known per se, from a belt-pulley so that, through the intermediary of a bevel-wheel 37, a rotating movement is communicated to the ring gear 3, a reciprocating movement being communicated to the carriage 5 through the intermediary of a system of hinged levers.

For the insertion of the decapitated fish into the machine the carriage is stopped for a moment each time when it is in its extreme front-position. The fish is then placed on the bracket 6, the abdominal cavity turned down, so that this bracket is in the abdominal cavity its point pressing against the end of the abdominal cavity. The prismatic-portion of the dorsal-bone is therefore riding on the back of the roof-shaped bracket (Figs. 4 and 5). The tail of the fish, the tail fin of which may be cut off, is in the channel formed by the bars 7, 8. When the tail fin is not cut off it reaches, as shown in Fig. 4, into the tail clamp 9 under the bars 7, 8 and is securely held by the same.

At the movement of the carriage 5 in longitudinal direction which then begins towards the cutting knives 10, 11, 12 and 13 the guide-pulley 36 is pressed, by the action of its spring, against the back of the fish, holding the dorsal-fins in vertical position and moves these fins towards the knives 10, 12. Shortly before the tail-point strikes against these knives 10, 12, the roller 33 drops into engagement with the cam surface 24, the rod 31 makes the lever 27 oscillate and the slide 20 slides downward in the curved slot 19 and makes the knife 12 oscillate around point $a$ so that it assumes a position in the same direction as knife 10. (Fig. 3, position in full lines). The two knives 10 and 12 cut then perpendicularly into the fish, both at the right hand side of the oval portion of the dorsal-fin in the tail-portion (Fig. 6). The fact that an incision is made into the fish at one side only presents the advantage that a somewhat thicker bone can yield in lateral direction without being jammed in the interval between two knives which are moving the one at the side of the other. Shortly before the prismatic-portion of the dorsal-bone strikes against the front-knives 10, 12, the roller 33 comes out of the cam slot 24, whereby the lever 27 is made to return into its initial position and the knife 12 is oscillated into its angular position around point $a$. The position which the knives 10, 11, 12 and 13 assume then, shown in Fig. 3, is so that the two rear-knives 11, 13 are standing in the same direction, the lower knife 12 standing at an angle to the upper knife 10, as shown in mixed lines. While the knife 10 is cutting along the dorsal-fins, the knife 12 cuts at the side of the prismatic-portion of the dorsal bone (Fig. 5) and cuts the rib-bones free at the same time.

Shortly before the fish, at the continuing movement in longitudinal direction of the carriage 5, strikes against the knives 11, 13, the roller 32 comes into engagement with the other cam slot 24ª, whereby the knife 13 is oscillated into a position in the same direction as the knife 11, so that a longitudinal cut is made first at the left of the oval-portion (Fig. 6 in mixed lines) and after the backward oscillation of the knife 13 also at the side of the prismatic-portion of the dorsal-bone (Fig. 5, mixed lines). The upper and lower knives encounter one another approximately at the middle of the length of the oval-portion and above the prismatic portion of the dorsal-bone.

It is advisable not to sever the skin or the flesh, i. e. the two fillets, completely from the dorsal-bone but to leave a certain connection between the dorsal-bone and the fillets. After the termination of the cutting-process, the dorsal bone can then be removed from the machine together with the two fillets which are very sensitive, to be folded open and placed, skin side turned downward, upon a table after the flesh or skin has been completely severed from the dorsal-bone, to be then conveyed to a skinning machine, the dorsal-bone dropping into a collecting-vessel.

When the cutting-process is completed and the fish removed from the machine, the carriage 5 moves back into the initial position in order to receive a fresh fish.

The machine may evidently be modified as regards driving of the cutting-tools and as regards mutual position of these tools. Instead of a reciprocating carriage, a circulating carriage may be used, and the fish may be inserted into the machine, instead of abdomen turned down, lying on the back, guide-rollers or pulleys, similar to pulley 36, or any other suitable guiding means being then arranged under the fish, while the bracket 6 is inserted from above into the abdominal cavity of the fish. The knives must then be arranged otherwise so that the oscillatable knives are on the top and the knives moving in uniform direction are below.

I claim:

1. In a filleting machine, primary and secondary pairs of rotary cutters for action respectively on opposite sides of the line of the backbone of the fish, a fish supporting carriage movable relatively to the cutters to present the fish successively to the action of the respective pairs of cutters, and means for controlling the cutters of each pair so as to cause one cutter of each pair to cut vertically from above downward to a certain depth for a portion of its cut and then to cut to a lesser depth for the remainder of its cut and simultaneously causing the other cutter of the same pair to first cut vertically upward for a portion of its cut in the plane of the coacting cutter and to then cut at an upward and inward oblique angle to the vertical during the remainder of its cut.

2. In a filleting machine, front and rear pairs of rotary cutters for operation successively and respectively to cut away the flesh on opposite sides of the backbone of the fish, a reciprocatory carriage for supporting the fish and presenting the same successively to the action of the pairs of cutters, and means for controlling the cutters to cause one cutter of each pair to cut vertically and to cause the other cutter of each pair to first cut vertically and then cut at an upward and inward oblique angle to the vertical.

3. In a filleting machine, front and rear pairs of rotary cutters for operation successively and respectively to cut away the flesh on opposite sides of the backbone of the fish, a reciprocatory carriage for supporting the fish and presenting the same successively to the action of the pairs of cutters, shifting means for adjusting the cutters, and means on the carriage governing said shifting means for controlling the cutters to cause one cutter of each pair to cut vertically and to cause the other cutter of each pair to first cut vertically and then cut at an upward and inward oblique angle to the vertical.

4. In a filleting machine, front and rear pairs of rotary cutters for operation successively to cut away the flesh on opposite sides of the backbone of the fish, a reciprocatory carriage provided with a supporting member of inverted V-shaped cross-section to support the fish, and means for controlling the cutters to cause one cutter of each pair to cut vertically and to cause the other cutter of each pair to first cut vertically and then cut at an upward and inward oblique angle to the vertical.

5. In a filleting machine, front and rear pairs of rotary cutters for operation successively to cut away the flesh on opposite sides of the backbone of the fish, a reciprocatory carriage provided with a supporting member of inverted V-shaped cross-section to support the fish, shifting means for adjusting the cutters, and means on the carriage governing said shifting means for controlling the cutters to cause one cutter of each pair to cut vertically and to cause the other cutter of each pair to first cut vertically and then cut at an upward and inward oblique angle to the vertical.

6. In a filleting machine, front and rear pairs of rotary cutters for operation respectively to cut away the flesh on opposite sides of the backbone of the fish, one of the cutters of each pair being adjustable to regulate its cut and acting to cut in a vertical plane and the other cutter of each pair being adjustable in an arc to cut vertically or at an angle to the vertical, shifting means for simultaneously adjusting the cutters of each pair, and means on the carriage controlling said shifting means of the pairs of cutters successively to regulate the depth of cutting action of the first-named cutter of each pair and to adjust the second-named cutter of each pair to first cut vertically and then cut at an angle to the vertical.

7. In a filleting machine, a frame, an annular support on the frame having an opening therein, guides extending through said opening, a carriage reciprocably mounted on said guides, a rotary gear ring on the support, front and rear pairs of rotary cutters mounted on the support for operation respectively to cut away the flesh on opposite sides of the backbone of the fish, said cutters being in gear with said gear ring, shifting devices, one for each pair of cutters, for adjusting one cutter of each pair in a vertical plane to regulate its depth of cut and for adjusting the other cutter of the same pair to cut vertically or at an angle to the vertical, and means on the carriage for successively operating said devices in the feed travel of the carriage.

In testimony whereof I affix my signature.
RUDOLPH BAADER.